United States Patent [19]
Zelli

[11] 3,915,429
[45] Oct. 28, 1975

[54] DOLLY FOR USE IN CINEMATOGRAPHIC AND TELEVISION CAMERAS WITH TELESCOPIC LIFTING ARM

[76] Inventor: Sante Zelli, 24 Via della Pace, Rome, Italy

[22] Filed: Sept. 3, 1974

[21] Appl. No.: 502,764

[30] Foreign Application Priority Data
Sept. 3, 1973 Italy .................................. 52298/73

[52] U.S. Cl. .................................. 254/8 R; 254/124
[51] Int. Cl.² .................................................. B66F 3/00
[58] Field of Search .......... 254/2 R, 8 R, 124; 182/2

[56] References Cited
UNITED STATES PATENTS

| | | | |
|---|---|---|---|
| 2,073,998 | 3/1937 | Raby | 254/2 R |
| 2,785,807 | 3/1957 | Prowinsky | 254/9 R |
| 3,168,284 | 2/1965 | Fisher | 254/8 R |
| 3,281,118 | 10/1966 | Krilanovich | 254/124 |
| 3,625,304 | 12/1971 | Siefermann | 182/2 |

FOREIGN PATENTS OR APPLICATIONS

| | | | |
|---|---|---|---|
| 543,724 | 7/1950 | Canada | 182/2 |

*Primary Examiner*—Al Lawrence Smith
*Assistant Examiner*—Robert C. Watson
*Attorney, Agent, or Firm*—Ernest F. Marmorek

[57] ABSTRACT

The invention refers in general to moving carriages used in all industries which have lifting and depositing problems, and refers more particularly to an improved type of lifting arm for cinema and television "dollies," with telescopic prolongation of the arm for progressive angular extrusion, and with automatic compensation of the angles of the camera support and operator's seat.

7 Claims, 3 Drawing Figures

3,915,429

DOLLY FOR USE IN CINEMATOGRAFIC AND TELEVISION CAMERAS WITH TELESCOPIC LIFTING ARM

From the start of the cinema era it was found that shots had to be taken during which the position varied in distance and angle as between the scene shot and the camera. This problem was met by using mobile supports or carriages carrying both the camera and the operator. Various types of wheeled carriages were developed enabling the camera to be moved nearer to or further away from the scene and also raised or lowered in relation thereto, thus altering the shotting angle.

However, with the progress of the art of the cinema the demands made on a carriage of this kind became more and more stringent and the problems to be solved more and more numerous and acute. One example is the need to raise the camera without varying the distance from the scene shot, as when a fresco painting is photographed in an interior, the use of a carriage with an overhung arm causing the camera to move away from the painting, unless complicated compensating devices are provided.

In general, therefore, it is an aim of the invention to provide a cinema and television dolly which obviates all the disadvantages of the prior art dollies, including their high cost.

One aim of the invention is to provide a dolly of the kind specified comprising means which enable the height of the camera and operator to be altered by vertical displacement of either the camera support or the operator's seat.

Another aim of the invention is to provide a dolly having a telescopically extending lifting arm and comprising means for keeping the plane of the camera support parallel with itself.

Another object of the invention is to provide a dolly of the kind specified having a telescopically extending lifting arm operated by a hydraulic jack, means being provided to keep the operator's seat parallel with itself and equidistant from the camera.

In the preferred embodiment the invention comprises a base having wheels and bearing a guide bar and two pivot brackets and a telescopic lifting arm mounted on such base, characterized in that the telescopic lifting arm comprises a rear element and a front element contained and guided by the former, which is hinged at its lower end on a slide which can slide over the guide bar borne by the base, and comprises a support for the cinema or television camera which is hinged to the end of the front element, and a seat hinged to the end of a bar attached to the front element, the dolly also being characterized in that it comprises an arrangement for extending and lifting the telescopic arm; means for ensuring that the camera support remains parallel with itself during and with lifting; and means to ensure that the seat remains parallel with itself during and with lifting.

The invention and its other aims and features will be more clearly understood from the following description of the preferred embodiment thereof with reference to the accompanying merely illustrative non-limitative drawings, wherein.

Figure 1:
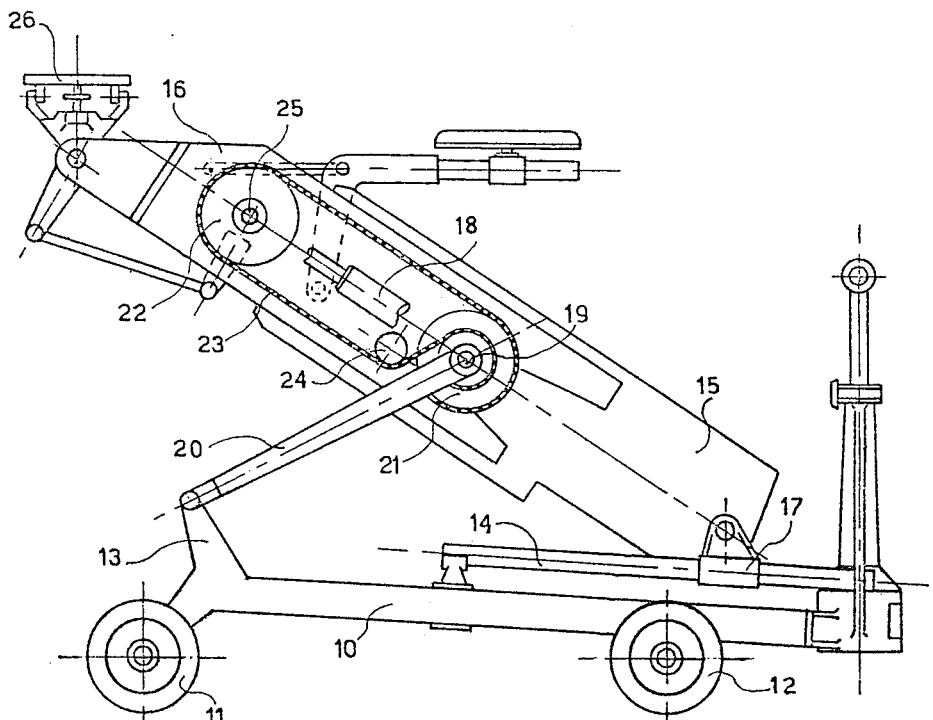
FIG. 1 is a vertical side elevation, with some parts sectioned and other parts omitted, of the dolly having a telescopic lifting arm, in the almost completely lowered position.

Referring to the drawings, it can be seen that the dolly having a lifting arm is formed by a base 10 having wheels 11, 12, its particular construction not forming part of the invention. Disposed on the base 10 are two pivoting brackets 13 and a guide bar 14 whose functions will be described clearly hereinafter.

Also mounted on the base 10 is the telescopic lifting arm forming the basic feature of the invention. The telescopic lifting arm is formed by two box-type elements, a rear element 15 and a front element 16 which forms the extensible element and is contained and telescopically guided by the rear element 15. The rear element 15 is pivoted at its lower end of a slide 17 sliding on the guide bar 14 on the base 10. The rear element 15 is connected to the extensible front element 16 by a hydraulic jack 18 having its cylinder attached to the rear element 15 and its piston attached to the extensible element 16, so that actuation of the jack 18 extends the front element 16, which slides inside the rear element 15.

Extending through the rear element 15 is a pivot 19 to whose ends two arms 20 (only one shown in the drawing) are rigidly attached which are pivoted at the other ends on the pivoting brackets 13 (only one shown in the drawings) borne by the base 10. Also attached to the pivot 19 is a first toothed wheel 21 having a peripheral teething and an inside teething.

The extensible front element 16 bears a second toothed wheel 22 having a number of teeth equal to the number of teeth of the peripheral toothing of the toothed wheel 21. A chain run 23 has one end attached to the periphery of the toothed wheel 21 and then passes inside the toothed wheel 22 and then, via a toothed reversing roller 24, is wound on the inside toothing of the toothed wheel 21, to which the other end of the chain run 23 is attached.

The directions of winding of the chain 23 on the two toothings of the first toothed wheel 21 are identical, as clearly shown in the drawings.

The relationship between the number of teeth in the toothings will be obvious, having regard to the method of operation and intended results.

Operation is as follows: the actuation of the jack 18 extends the front element 16 in relation to the rear element 15. The movement of the pivot 25 of the toothed wheel 22 away from the pivot 19 of the toothed wheel 21 causes the two chain runs 23 to be unwound from the inside and peripheral toothings of the toothed wheel 21. Since the number of teeth of the inside toothing is less than the number of teeth of the peripheral toothing of the toothed wheel 21, the length of chain unwound from the two toothings will be different, thus causing a rotation of the second toothed wheel 22 also.

More precisely, if the relationship between the number of teeth of the inside and peripheral toothings of the toothed wheel 21 is 1: 2, there will be unwound from the peripheral toothing a length of chain double that which is unwound from the inside toothing, and the toothed wheel 22 will rotate in the same direction as the toothed wheel 21, but by half the amount. The purpose of this rotation will be clearly gathered hereinafter.

Figure 2:
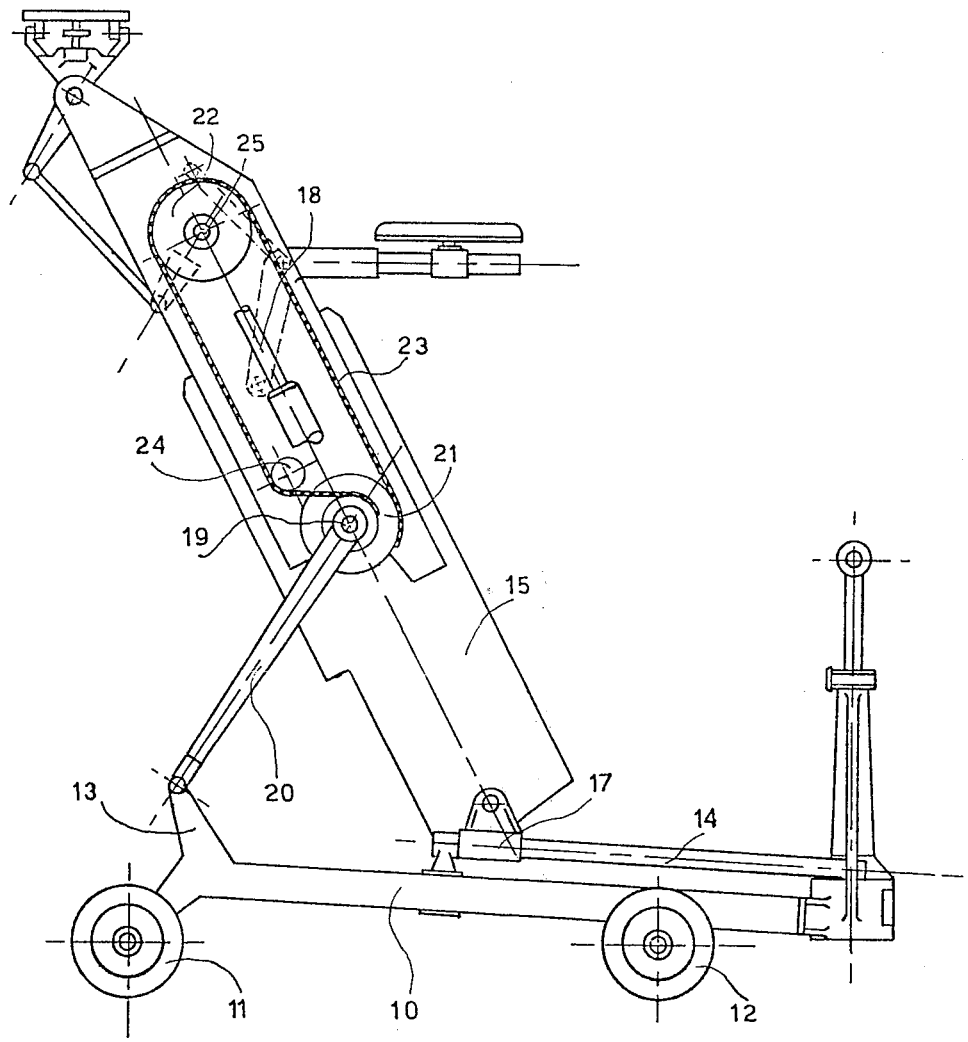
FIG. 2 is a vertical side elevation, with some parts sectioned and other parts omitted, of the dolly illustrated in FIG. 1, in the almost completely raised position.

Continuing the explanation of operation; it has been seen that the actuation of the jack 18 causes toothed wheel 21 to rotate. Since the toothed wheel 21 is rigidly connected to the pivot 19 and the arms 20, the final consequence of the actuating of the jack is to extend the front element 16 and make the arms 20 rotate anticlockwise around their pivots on the brackets 13 borne by the base. All this brings about the erection of the assembly of the lifting arm 15, 16, accompanied by the sliding of the slide 17 along the guide bar 14 borne by the base 10. This position is illustrated in FIG. 2.

First it should be noted that the camera support 26 has been lifted with a displacement which is exactly vertical, and not inclined or arcuate.

Figure 3:
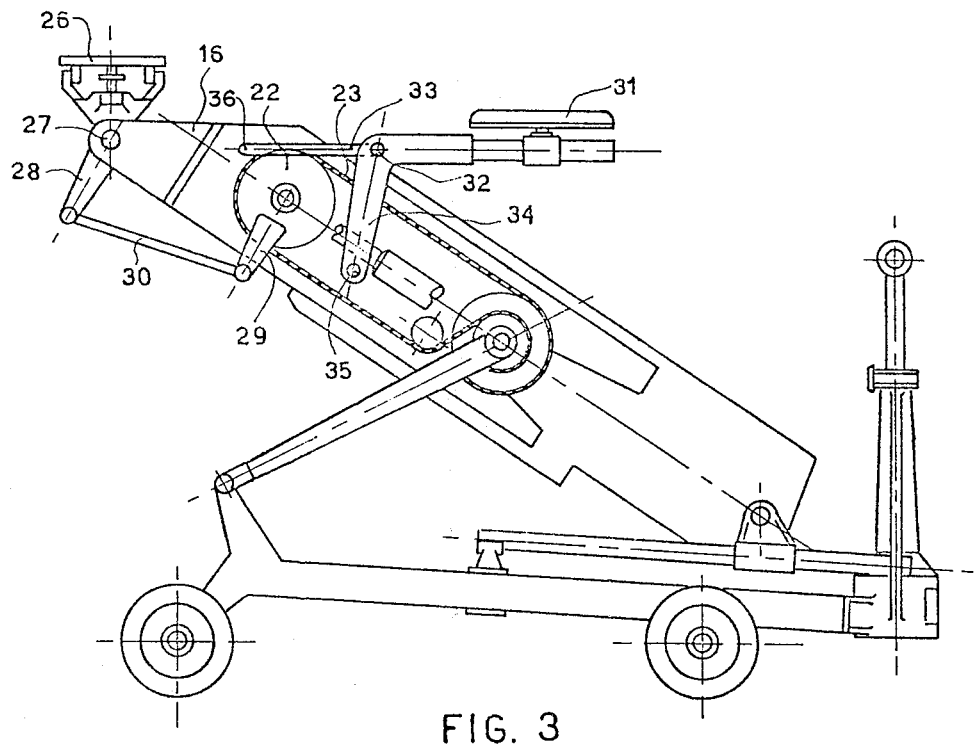
FIG. 3 is a lateral elevation, corresponding to FIG. 1, illustrating more particularly the parallelogram devices ensuring that the operator's seat and the camera support are horizontal.

The camera support 26 is pivoted at a place 27 (FIG. 3) to the end of the extensible front element 16. To ensure that the plane 26 always remains parallel with itself as the inclination of the lifting arm 15, 16 varies, an articulated parallelogram device is provided comprising: an arm 28 connected to the support 26, an arm 29 connected to the toothed wheel 22; a rod 30 articulated between the ends of the arms 28, 29 and an imaginary rod extending between the pivots 25 and 27 and in practice formed by the rigid body of the extensible front element 16.

It will now be clear that since the support 26 must always remain parallel with itself, the arm 29 must also remain parallel with itself, since the toothed wheel 22 to which the arm 29 is connected must rotate, as a result of the chain 23 and the difference in the number of teeth between the inside and peripheral toothings of the toothed wheel 21, to exactly the amount sufficient to cancel out the rotation which it undergoes as a result of the variation in inclination of the telescopic arm 15, 16, during its extension.

To summarize; the telescopic arm 15, 16 as it is extended causes a rotation of the support 26, such rotation being compensated and cancelled out, at each moment, via the articulated parallelogram 28, 30, 29, 16, as a result of an equal and opposite rotation of the toothed wheel 22. The toothed wheel 22 rotates only with respect to the pivot of the telescopic arm 15, 16, but does not rotate with regard to the space outside, as neither do the arms 28, 29 or the support 26.

The seat 31 is pivoted at a place 32 on the end of a bar 33 attached to the extensible front element 16 by pivot 36. To ensure that the seat 31 always remains parallel with itself as the inclination of the lifting arm 15, 16 varies, an articulated linkage device is provided comprising an arm 34 connected to the seat and pivoted at a place 35 on the rear element 15. In the light of the foregoing explanations of the orientation of the support 26, there should be no difficulty in understanding the operation of the aforedescribed linkage 34, 35, 36, 16 adapted to retain the seat 31 in its plane.

As regards the hydraulic jack 18; the hydraulic circuit has an accumulator which is periodically recharged by a motor-pump set or a manually operated pump. The jack is single acting and its feed duct contains a volume-adjusting valve insensitive to variations in pressure upstream of a threeway distributing box and having variable apertures.

This system produces gentle and gradual adjustment of the speed of the arm, independently of the variations in pressure in the accumulator, for any elevation. The discharged fluid is collected in a reservoir from which it is periodically pumped back to the accumulator.

Actuation is performed by an electric motor having a remote control switch so disposed as to periodically interrupt the a.c. or d.c. supply of the motor when a predetermined maximum pressure is reached, detected by a thrustmeter.

The foregoing describes the preferred embodiment of the invention, but of course, engineers in the art can produce variants and modifications thereof without exceeding the scope or departing from the spirit of the invention.

I claim:

1. A cinema and television dolly, for use in connection with a camera, comprising, in combination:

a base;

movable ground engaging means connected to said base and operative for making said base mobile;

telescopic lifting means comprising rear and front elements and operative to be driven to telescopically extend said front element with respect to said rear element;

first connecting means slidably and pivotally connecting the lower end of said rear element to said base;

driving means for said telescopic lifting means for extending said front element and rotating said telescopic lifting means with respect to said first connecting means;

first support means having a surface for receiving said camera during the use of said dolly;

second connecting means pivotally connecting said first support means to the top of said front element and movable therewith;

second support means having a surface defining a seat for a person;

third connecting means pivotally connecting said second support means to said front element and movable therewith;

first control means connected to said first support means and operative to maintain said surface of said first support means substantially parallel to itself during movement of said telescopic lifting means; and second control means connected to said second support means and operative to maintain said seat surface of said second support means substantially parallel to itself during movement of said telescopic lifting means.

2. The dolly as claimed in claim 1, wherein said driving means comprises a hydraulic jack connected between said rear element and said front element, first gear means pivotally connected to a pivot part of said rear element and having peripheral toothing and internal toothing;

two arm means each pivotally connected near one end to said pivot part and near the other end to said base;

second gear means pivotally connected to said front element;

reversing gear roller means connected to said front element; and a predetermined length of chain having one end connected to the periphery of said first gear means to engage at least some of the teeth thereof, extending around said second gear means to engage at least some of the teeth thereof, and then around said reversing gear roller means, and having its other end connected to the inside toothing of said first gear means.

3. The dolly as claimed in claim 2, wherein the end runs of said chain are wound in the same direction of winding on the peripheral toothing and the inside toothing of said first gear means and are attached thereto.

4. The dolly as claimed in claim 1, wherein said first control means comprises an articulated parallelogram device including first arm means connected to said first support means, second arm means connected to said second gear means, and a rod articulated between the ends of said first and second arm means.

5. The dolly as claimed in claim 1, wherein said second control means comprises an articulated linkage device including arm means connected to said seat and pivotally connected to said first element, and a bar pivotally connected to said front element.

6. The dolly as claimed in claim 2, wherein the number of teeth of the peripheral teeth of said first and said second gear means are the same.

7. The dolly as claimed in claim 2, wherein the ratio between the number of teeth in the inside toothing and the peripheral toothing of said first gear means is 1:2.

* * * * *